Dec. 1, 1953 M. I. DARROW ET AL 2,660,756
METHOD OF REMOVING POULTRY GIZZARD LININGS
Original Filed Dec. 12, 1949
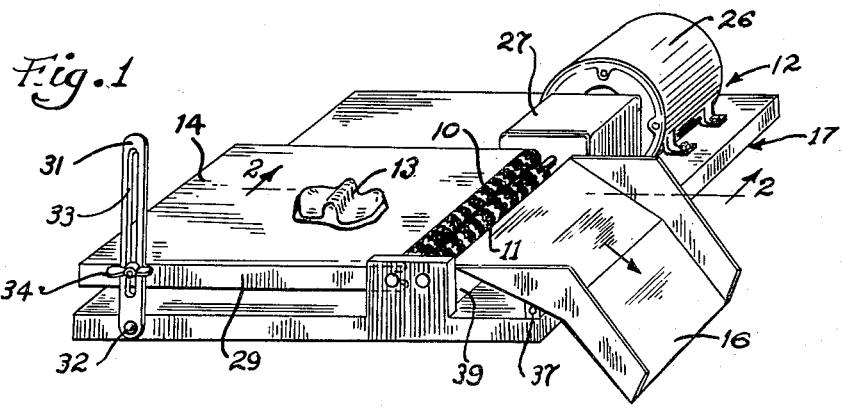
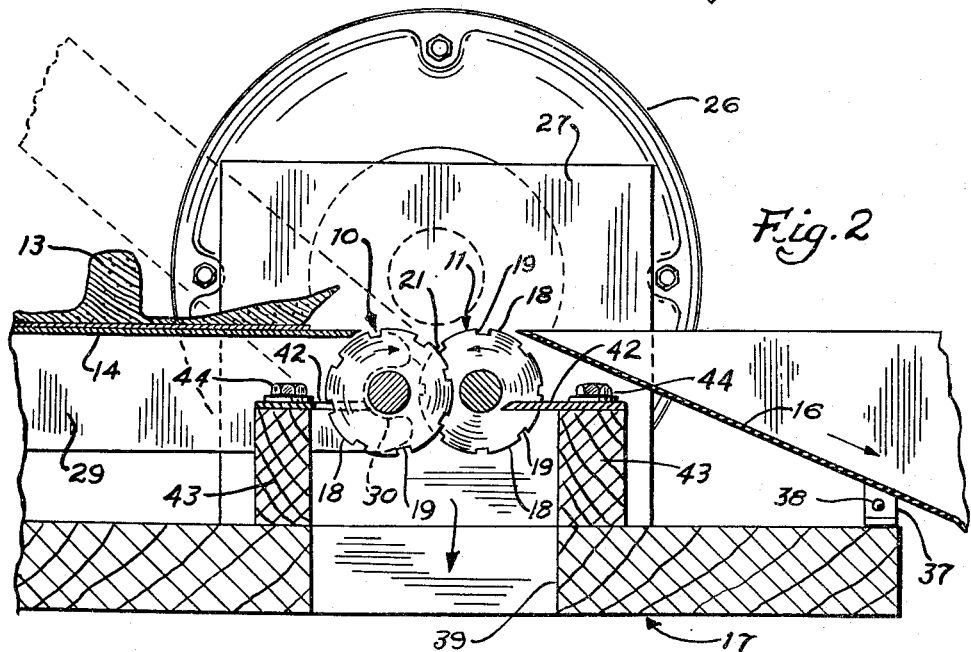
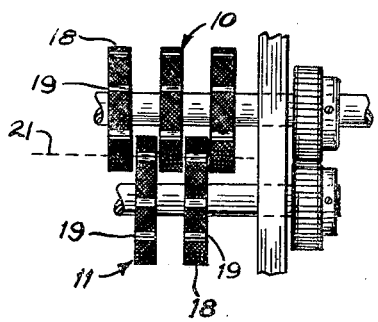
INVENTORS
Merritt I. Darrow
Guy R. Biddinger
William J. Patterson
BY
R. H. Story
ATTORNEY

Patented Dec. 1, 1953

2,660,756

UNITED STATES PATENT OFFICE 2,660,756

METHOD OF REMOVING POULTRY GIZZARD LININGS

Merritt I. Darrow, Chicago, Guy R. Biddinger, Bellwood, and William J. Patterson, La Grange, Ill., assignors to Swift & Company, Chicago, Ill., a corporation of Illinois Original application December 12, 1949, Serial No. 132,638, now Patent No. 2,620,510, dated December 9, 1952. Divided and this application March 13, 1952, Serial No. 276,384

3 Claims. (Cl. 17—45)

The present invention relates to a method for removing the lining from poultry gizzards.

In the dressing of poultry for the market, particularly that which is to be cut up, packaged, and frozen before distribution, it is desirable to have each portion of the bird completely prepared for cooking. The product is more salable if all the housewife has to do is to place it in the pan and cook it. To this end the gizzards of the birds are cut open and the inner lining of the gizzard removed before it is packaged and frozen.

At the present time this operation is performed by hand. The gizzard is cut open, an edge of the lining is cut or otherwise raised away from the gizzard wall so that the lining may be grasped by the fingers, and it is then pulled away from the wall. While the labor need not be skilled, it is time-consuming and an experienced worker can only process about 200 gizzards per hour. In a plant where the volume of birds that are eviscerated and packed is enormous the labor involved in the operation of removing gizzard linings can be a substantial item of cost.

The principal object of the present invention is the quick and easy removal of the gizzard linings to speed the processing of poultry and to reduce the cost that is involved. A prototype of the present invention operated under normal plant conditions to remove the linings of from 1200 to 1300 gizzards per hour. The saving in labor cost for a nominal capital expenditure is substantial and many of the employes presently working at this task may be transferred to other duties in connection with the processing of the poultry.

Additional objects and advantages will become apparent from the following description taken in conjunction with the drawings in which:

Fig. 1 is a perspective view of an embodiment of the invention; and

Fig. 2 is an elevational enlarged section taken at line 2—2 of Fig. 1; and

Fig. 3 is a plan view of a portion of the pulling rollers.

As illustrated in Figs. 1 and 2, our invention includes a pair of rollers 10 and 11 which are rotated in opposite directions by a power means, generally 12. The gizzard 13, which has been cut open, is placed with the lining down on a feed plate 14 over which the gizzard is moved to the rollers 10 and 11. After the gizzard lining has been removed, it is discharged over a conveyor or chute 16. The various parts of the device are mounted on a frame, generally 17.

Each of the rollers 10 and 11 is formed with a plurality of spaced annular ridges 18 having a generally cylindrical configuration. The rollers are journaled in frame 17 in such a position that the ridges of one of the rollers intermesh with the ridges of the other of the rollers as illustrated particularly in Fig. 3.

Ridges 18 are slightly smaller in thickness than the width of the grooves, the intermediate spaces between the ridges. The maximum radius of the generally cylindrical ridge plus the maximum radius of the portion of the shaft intermediate of the ridges is slightly less than the distance between the longitudinal axes of the two rollers. Thus, a clearance is provided on all sides between the intermeshing pairs of ridges. A clearance of approxiamtely .003 of an inch between the periphery of the ridges and the bottom of the grooves, and .0015 of an inch between the sides of adjacent intermeshing ridges will be found to be satisfactory although this may be varied somewhat in some embodiments of the invention.

The peripheries of the ridges 18 are knurled and have a plurality of transverse notches 19 cut therein. The notches 19 in adjacent ridges 18 are staggered as illustrated in Fig. 3. The size of the notches is approxiamtely $\frac{1}{16}''$ wide and $\frac{3}{32}''$ deep.

In some embodiments of the invention the knurling or use of the notches 19, or both, may be disposed with. Rollers which do not have a roughened surface at the periphery of the ridges are safer in use because there is little likelihood of tearing or otherwise abrading the fingers of the operators who are feeding the material into the machine.

However, the lack of the roughened surface slows down the operation of the machine inasmuch as the operator is required to take additional time to insert an edge of the gizzard lining into the line of juncture 21 between the rollers. Furthermore, should only a portion of the lining be torn off, as some times happens, the operator must again insert an edge of the remaining lining into the line of juncture 21 to remove the remainder of the lining.

When the peripheries of the rollers are roughened, as illustrated in Fig. 3, feeding of the skin into the line of juncture is automatically performed by the contact with the rollers. Even if only a portion of the lining should be initially removed, the rollers will again catch the remainder of the lining and pull it between the rollers.

The power means 12 includes an electric motor 26 and a suitable gear mechanism in gear case 27. Rollers 10 and 11 are connected to the gearing within case 27 so that the rollers will rotate in opposite directions with the rollers turning inwardly toward each other in the area across which the gizzard is passed for the lining to be removed. The rolls preferably turn at a relatively low speed (about 230 R. P. M.) although the exact speed is not particularly critical and may be varied within reasonable limits.

Feed plate 14 is formed with a pair of side members 29 having a rounded nose with an opening 30 therein to fit around the shaft portion of roller 10. This structure permits the feed plate 14 to be pivoted about substantially the same axis as the longitudinal axis of roller 10 and maintained approximately parallel to the roller axis. A bracket 31 attached at one end to frame 17 by means of a pin 32 permits the angle of the table to be fixed with respect to the pair of rollers 10 and 11. Bracket 31 has a slot 33 to receive a clamping bolt and a wing nut 34 in a well known manner. By loosening the wing nut 34 the feed plate 14 may be raised or lowered to a desired angle. If the incline of plate 14 is sufficient the gizzards 13 may be moved down the plate 14 by gravity.

As the pair of rollers grasp the gizzard lining and pull it away from the gizzard down between the pair of rollers, the gizzard is supported by the top of the rollers and is moved across from feed plate 14 to the discharge conveyor or chute 16. The chute is attached to frame 17, as by means of a two-piece bracket 37 having a connecting pin 38 therein. The chute 16 may be pivoted about pin 38 with respect to frame 17. The ability to pivot the chute away from the pair of rollers facilitates the cleaning of the machine at the end of a period of use. The gizzards are discharged down the chute into a suitable receptacle (not shown) by means of gravity. Below the rollers there is provided an opening 39 in frame 17 to allow the linings to fall into a suitable receptacle (not shown).

To facilitate the cleaning of the machine and to strip any linings from the rollers should the former tend to stick to the rollers and revolve therewith there is provided a pair of combs 42 which contact the shaft portions of the rollers intermediate of the ridges 18. The combs are mounted on pillars 43 of frame 17 and are attached thereto by stud bolts 44 so that the combs may be removed for cleaning if so desired.

As has previously been explained, the feed plate 14 may be inclined to allow the plate to act as a gravity conveyor to feed the opened gizzards 13 to the rollers. It will be apparent that with feed plate 14 in a horizontal position a number of power mechanical conveying devices may be used to move the gizzards to the rollers. With a roughened periphery on the rollers the hand feeding of gizzards to the rollers is not recommended because of the danger of injury to the operator. Since the rollers do take a hold of the lining and move it down to the line of juncture 21 where it can be securely gripped between the intermeshing ridges, power feeding means may be readily used and an operator is not required to insert an edge of the lining between the rollers.

If the gizzard is allowed to remain on top of the rollers, an abrading action will take place. However, the removal of the gizzard lining is accomplished by reason of the lining becoming pinched between the adjacent ridges of the rollers and being pulled from the gizzard proper down through the pair of intermeshing rollers where it is discharged through opening 39. By reason of this action the lining is removed without any material deleterious action on the gizzard proper.

The instant application is a division of our prior application, Serial No. 132,638, filed December 12, 1949, now Patent No. 2,620,510 issued December 9, 1952.

We claim:

1. The method of removing the lining from opened poultry gizzards including the steps of simultaneously pinching the lining at spaced points therealong to grasp the lining, and separating said lining from the gizzard.

2. The method of removing the lining from opened poultry gizzards including the steps of pinching the lining at spaced, linearly placed points therealong to grasp the lining, and separating said lining from the gizzard while stretching the lining intermediate said points in a direction generally normal to the line of said linearly placed points to corrugate the lining.

3. The method of removing the lining from poultry gizzards including the steps of opening the gizzard, simultaneously pinching the lining at spaced points therealong to grasp the lining, supporting the gizzard against movement in a given direction, and pulling said grasped lining in said direction to separate said lining from the gizzard.

MERRITT I. DARROW.
GUY R. BIDDINGER.
WILLIAM J. PATTERSON.

No references cited.